US010562695B2

(12) United States Patent
Knight et al.

(10) Patent No.: US 10,562,695 B2
(45) Date of Patent: Feb. 18, 2020

(54) THERMALLY INSULATED CONTAINER AND METHOD FOR MAKING SAME

(71) Applicant: LAMINAR MEDICA LIMITED, Tring Hertfordshire (GB)

(72) Inventors: Philip Knight, Tring Hertfordshire (GB); Scott Talbot, Tring Hertfordshire (GB); Geraint Thomas, Tring Hertfordshire (GB)

(73) Assignee: LAMINAR MEDICA LIMITED, Tring Hertfordshire (GB)

( * ) Notice: Subject to any disclaimer, the term of this patent is extended or adjusted under 35 U.S.C. 154(b) by 154 days.

(21) Appl. No.: 15/548,839

(22) PCT Filed: Jan. 29, 2016

(86) PCT No.: PCT/GB2016/050192
§ 371 (c)(1),
(2) Date: Aug. 4, 2017

(87) PCT Pub. No.: WO2016/124891
PCT Pub. Date: Aug. 11, 2016

(65) Prior Publication Data

US 2018/0016083 A1 Jan. 18, 2018

(30) Foreign Application Priority Data

Feb. 5, 2015 (GB) .................................. 1501915.1

(51) Int. Cl.
*B65D 81/38* (2006.01)
*F25D 3/06* (2006.01)
(Continued)

(52) U.S. Cl.
CPC ....... *B65D 81/3816* (2013.01); *B29D 22/003* (2013.01); *B29D 99/0096* (2013.01);
(Continued)

(58) Field of Classification Search
CPC ........... B65D 81/3816; B65D 43/0202; B65D 81/18; B29D 22/003; B29D 99/0096;
(Continued)

(56) References Cited

U.S. PATENT DOCUMENTS 3,093,259 A * 6/1963 Morrison ........... B65D 11/1873 220/592.25
4,319,629 A * 3/1982 Hotta ..................... A45C 11/20 126/400
(Continued)

FOREIGN PATENT DOCUMENTS

EP 2 022 728 A1 2/2009
WO 2012094333 A1 7/2012
WO 2014147425 A2 9/2014

OTHER PUBLICATIONS

International Search Report related to Application No. PCT/GB2016/050192; dated Apr. 6, 2016.

*Primary Examiner* — Gideon R Weinerth
(74) *Attorney, Agent, or Firm* — Miller, Matthias & Hull LLP

(57) ABSTRACT

A first aspect the present invention provides a thermally insulated container comprising a lid and a main body moulded from a single piece of expanded foam with outwardly tapering inner walls, necessitated by the moulding process. The container is arranged to be closed by the lid so that cool packs in the container extend from a base inside the main body to inside the lid, wherein the inner surface of the walls of the lid are tapered such that positioning the lid on the main body, with the cool packs arranged around the inner surfaces of the walls, causes the cool packs to be aligned so that they extend vertically, perpendicular to an inner surface of the base of the main body. This permits regular rectangular cool packs to be used to assist assembly and to provide a regular parallel sided space inside of the cool packs, in which a product to be shipped may be housed.
(Continued)

According to a second aspect of the invention there is provided a method of moulding such a container, wherein the provision or absence of an insert on the mould tool permits the container to have, or not to have, provision to accommodate an insulation panel layer, without altering the inner or outer dimensions of the container formed by the method.

15 Claims, 4 Drawing Sheets

(51) Int. Cl.

| | |
|---|---|
| ***F25D 3/08*** | (2006.01) |
| ***B29D 22/00*** | (2006.01) |
| ***B29D 99/00*** | (2010.01) |
| ***B65D 43/02*** | (2006.01) |
| *B29K 25/00* | (2006.01) |
| *B29K 105/04* | (2006.01) |

(52) U.S. Cl.
CPC .......... *B65D 43/0202* (2013.01); *F25D 3/06* (2013.01); *F25D 3/08* (2013.01); *B29K 2025/06* (2013.01); *B29K 2105/04* (2013.01); *F25D 2201/14* (2013.01); *F25D 2303/0832* (2013.01); *F25D 2331/804* (2013.01)

(58) Field of Classification Search
CPC .......... F25D 3/06; F25D 3/08; F25D 2201/14; F25D 2303/0832; F25D 2331/804; F25D 11/003; F25D 11/006; F25D 2303/0843; F25D 2303/08221; F25D 2303/0822; F25D 2303/083; F25D 2303/085; F25D 2303/082; B29K 2025/06; B29K 2105/04; A01N 1/0273; A47J 41/0044; Y02W 30/807
USPC ......... 220/592.25; 62/371, 457.2, 457.7, 440
See application file for complete search history.

(56) References Cited

U.S. PATENT DOCUMENTS 4,498,312 A * 2/1985 Schlosser ................ A47J 39/00 62/371
4,923,077 A * 5/1990 Van Iperen ............ B65D 81/18 206/205
5,201,194 A * 4/1993 Flynn, Jr. ............... A47G 23/04 62/457.2
5,405,012 A * 4/1995 Shindler ............ A61B 10/0096 206/523
5,598,943 A * 2/1997 Markus .................. A45C 11/20 206/545
5,671,611 A * 9/1997 Quigley .................... F25D 3/08 62/457.7
6,067,810 A * 5/2000 Jennings ............... A47F 3/0439 62/246
6,370,885 B1 * 4/2002 Jennings ............... A47F 3/0439 62/249
6,971,539 B1 * 12/2005 Abbe ................... B65D 25/205 220/592.12
8,443,623 B2 * 5/2013 Matta ...................... B29C 44/14 62/457.2
8,544,648 B2 * 10/2013 Cleveland .......... B65D 21/0223 206/503
9,688,454 B2 * 6/2017 Ranade .................. B65D 81/38
9,751,682 B2 * 9/2017 Mayer ................ B65D 81/3825
2002/0134962 A1 * 9/2002 Romero ................. C09K 5/066 252/70
2003/0082357 A1 * 5/2003 Gokay ...................... B32B 3/04 428/212
2003/0230110 A1 * 12/2003 Linberg .................... F25D 3/08 62/457.1
2004/0025528 A1 * 2/2004 Gano, III ........... B65D 77/0486 62/371
2007/0157653 A1 * 7/2007 Sasaki .................... B65D 11/18 62/371
2009/0078699 A1 * 3/2009 Mustafa ............. B65D 81/3862 220/1.5
2010/0314397 A1 * 12/2010 Williams ........... B65D 81/3823 220/592.01
2010/0326993 A1 * 12/2010 Mayer ................ B65D 81/3825 220/592.27
2011/0147391 A1 * 6/2011 Corder .................... A61J 1/165 220/592.27
2011/0248038 A1 * 10/2011 Mayer .................. B65D 81/382 220/592.27
2011/0290792 A1 * 12/2011 Krzak ................ B65D 81/3816 220/1.5
2013/0228583 A1 * 9/2013 Mayer ................ B65D 21/0223 220/592.27
2013/0255306 A1 * 10/2013 Mayer ....................... F25D 3/08 62/457.2
2013/0340467 A1 * 12/2013 Kiedaisch ................. F25D 3/00 62/457.2
2014/0021208 A1 * 1/2014 Anti ..................... A01N 1/0273 220/592.25
2014/0054297 A1 * 2/2014 Patstone ................... F25D 3/08 220/592.01
2014/0311170 A1 * 10/2014 Mills ..................... F25D 11/003 62/62
2014/0353317 A1 * 12/2014 Ranade ................ B29D 22/003 220/592.01
2015/0166244 A1 * 6/2015 Wood ..................... B65D 81/18 220/592.25
2016/0244238 A1 * 8/2016 Hoggan ............. B65D 81/3823
2017/0073147 A1 * 3/2017 Kuhn ................. B65D 81/3823
2017/0082341 A1 * 3/2017 Shew ........................ F25D 3/06
2017/0158411 A1 * 6/2017 Taka .................. B65D 81/3823
2017/0305632 A1 * 10/2017 Brown ....................... F25D 3/08
2018/0016083 A1 * 1/2018 Knight ............... B65D 81/3816
2018/0283761 A1 * 10/2018 Buttiker .................... F25D 3/08
2018/0353379 A1 * 12/2018 Chou ...................... A61J 1/165
2019/0144193 A1 * 5/2019 Kim .................. B65D 81/3825 220/592.2
2019/0210790 A1 * 7/2019 Rizzo ........................ F25D 3/06
2019/0226744 A1 * 7/2019 Wood ........................ F25D 3/06

* cited by examiner 23
29
5
31
36
36
21
8
6
34
32
24
4
30
22

35
9
28
22
16
8
4
25
34
21
32
27
6
7
33
26

THERMALLY INSULATED CONTAINER AND METHOD FOR MAKING SAME

CROSS-REFERENCE TO RELATED APPLICATION

This Application is a 35 USC § 371 US National Stage filing of International Application No. PCT/GB2016/050192 filed on Jan. 29, 2016, and claims priority under the Paris Convention to Great Britain Patent Application No. 1501915.1 filed on Feb. 5, 2015.

FIELD OF THE INVENTION

The present invention relates to thermally insulated container and has particular, but not exclusive, application to insulated containers, known as insulated shippers, which are used to transport products at stabilised temperatures. The invention also relates to a method of making such a container.

BACKGROUND OF THE INVENTION

It is important that some products, for example certain types of pharmaceuticals or biotech products, are maintained within a specified temperature range, typically 2° to 8° C., to prevent the product from being damaged, or its shelf-life being reduced relative to the shelf-life stated on the product. The product may be a very high value medicine or the like, which will be worthless if its temperature is not correctly controlled. This may be problematic during shipment and use of an insulated shipper will often be necessary to make shipment practicable.

Passive insulated shippers comprise an insulated container comprising an insulated outer casing which is lined with, or houses, a number of cool blocks, cool trays, gel packs, cool bricks or similar, which for the purposes of the present specification are collectively referred to as cool packs. These may be cooled until a phase change occurs in the refrigerant in the cool packs, where the subsequent phase change back from a solid to a liquid acts to maintain the contents of the container at a constant temperature. Examples of materials which change state from a solid to a liquid to produce a cooling effect, are paraffin wax and water-based solutions.

Although reference above and below is made only to cool packs and the requirement to maintain a product at or below a certain temperature, those packs may also be used to maintain a product above a certain temperature, for example to stop a product freezing if it is being shipped in a cold climate. Thus, although for the purposes of this specification they will be referred to only as cool packs and only the case of keeping the product cool will be discussed, it will be appreciated that the invention is equally applicable to applications where it is desired to maintain the product above a desired temperature and the description and claims are to be interpreted so as not to preclude such an application.

The container may have an additional layer of insulation panels between the cool packs and an outer insulating layer of foam or a similar material to improve thermal efficiency, for example if the shipment is taking place in a hot climate or over extended period of time.

A passive shipper of the type described above therefore has a number of cool packs which have to be inserted before the shipper is used, in order to permit the cool packs to be cooled before use. It is desirable that the cool packs are standardised, to reduce the number of types of cool packs to assist in selection. It is also desirable that each cool pack can be positioned in one of several orientations, to assist in locating them correctly. It is also desirable that the cool packs be held in place only by the outer insulated walls of the container and possibly any intermediate layer of insulation panels. It is also desirable, especially in the case of disposable shippers which are not intended to be returned, that they are relatively inexpensive to manufacture.

SUMMARY OF THE INVENTION

According to a first aspect of the invention there is provided a thermally insulated container comprising: a main body moulded from a single piece of expanded foam; a lid; and a plurality of rectangular cool packs, wherein: the main body has a base and four walls which four walls define a mouth of the main body of the container, which mouth is arranged to be closed by the lid of the container, wherein: the inner surfaces of the walls of the main body taper from the mouth of the main body to the base of main body, such that the internal dimensions of the main body are greater at the mouth of the main body than they are at the base of the main body; the lid comprises a roof and four walls protruding downwardly from the roof which walls define a mouth of the lid which mouth of the lid is arranged to engage with the mouth of the main body so that the lid may close the main body of the container; when the container is closed the cool packs extend from towards the base inside the main body to inside the lid towards the roof of the lid; and the inner surface of the walls of the lid are tapered such that positioning the lid on the main body with the cool packs arranged around the inner surfaces of the walls causes the cool packs to be aligned so that they extend vertically perpendicular to an inner surface of the base of the main body.

The present invention may provide a relatively inexpensive thermally insulated container, because the container may be manufactured comprising only two main parts, a main body and a lid, with the main body at least being integrally moulded from a single piece of expanded foam. The advantage of this is that it avoids any cost associated with assembling different foam panels to form the main body and avoids any weaknesses which may otherwise result from joining different foam panels together, or arising from errors in construction. The disadvantage of the tapered inner walls, necessitated by the one piece moulding process are overcome by the lid subsequently correctly aligning the cool packs to define a parallel sided inner space for the product.

The invention permits uniform square or rectangular cool packs and/or insulation panels to be located in the container, internally of the expanded foam walls and for these to be held vertically in place by the lid being put in place, without the requirement for any additional fixings or padding. This permits the cool packs to be easily placed in the container as the number of cool pack types may be kept to a minimum. The cool packs being rectangular may also enable each cool pack to be placed in the container in any of two or more orientations, significantly simplifying the assembly procedure.

Once the cool packs have been assembled in the container, placing the lid on the container causes those cool packs to be vertically aligned and thus provide a parallel walled compartment for any product to be transported. Thus, if the product in plan view is dimensioned to correspond to the footprint inside the wall cool packs, where they join the base, then once the lid is in place the cool packs will be pressed against the product, both ensuring thermal contact with the product and acting to maintain the product securely in place during transportation.

In the context of the present specification, reference to the inner surfaces of the walls of the lid tapering from the mouth of the lid to the roof of the lid include any chamfering of the mouth of the lid, that is to say the rate of taper need not be uniform between the mouth of the lid and the inner surface of the roof of the lid.

Preferably, the internal dimensions of the main body at the base of the main body are the same as the internal dimensions of the lid at the roof of the lid. In this manner, when the lid is placed on the main body of the container, where the cool packs extend between the base of the main body and the roof of the lid, they will form a rectangular cuboid defining an internal space which may be fill with a product.

Advantageously, the lid is moulded from a single piece of expanded foam, thereby providing the same advantage as explained above with respect to the main body of the container. More preferably the lid and main body are moulded from the same type of expanded foam, such as expanded polystyrene, for they may then have walls of approximately the same thickness, be of similar strength and provide the same thermal insulation properties.

Preferably, the container comprises four wall cool packs dimensioned to fit against respective inner walls of the container. If the container is square these wall cool packs may be identical, permitting them to be interchangeable and for them to be located in any orientation, to assist assembly.

The edges of each cool pack are preferably arranged to abut those of an adjacent cool pack when the lid is closed and preferably the side edges of each cool pack are chamfered at 45° relative to the inner and outer faces, such that they may be locked together by the lid and main body, with the side edges abutting.

In one advantageous embodiment, the container comprises four wall cool packs arranged to line inner walls of the container, a base cool pack arranged to sit in the base of the main body and a top cool pack arranged to sit on the top of the wall cool packs. In this manner, cool packs are provided to all six sides of a product and may ensure that the product is uniformly maintained at the same temperature.

The cool packs may be formed from a rigid material such as high density polyethylene. The provision of rigid packs means that the cool packs themselves may define the internal space and be appropriately dimensioned so that they abut together, so that the mass of the cool packs cannot impact on the product during transportation.

The inner surfaces of the walls of the main body and the inner surfaces of the walls of the lid of the container may be arranged to directly contact the cool packs. Alternatively, a layer of insulation panels may be located between the inner walls of the main body and the cool packs, whereby positioning the lid on the main body, with the insulation panels arranged around the inner surfaces of the walls, causes the insulation panels to be aligned so that they extend vertically from an inner surface of the base of the main body and vertically align the wall cool packs located inside of the insulation panels. In this way, the inner surfaces of the main body and lid of the container act to align the cool packs by acting on the insulation panels between the inner surfaces of the walls and the cool packs.

According to a second aspect of the present invention there is provided a method of forming thermally insulated containers for transporting products, the method comprising, for a first container type: providing a mould tool having dimensions for moulding a main body of a first container type; using the mould tool to mould a main body of a first container from expanded foam; and inserting cool packs around the inner surfaces of the main body of the first container. The method further comprising, for forming a second container type: placing an insert or inserts within the mould tool for the main body of the first container type; using the mould tool to mould a main body of a second container type from expanded foam, inserting insulation panels in the spaces in the main body formed by said insert or inserts and inserting cool packs around the inner surfaces of the main body or around inner surfaces defined by the insulation panels.

The second aspect of the present invention provides a method of manufacturing two container types having identical internal and external dimensions, so that each type of container may hold the same type and quantity of product and the same number of containers may be housed within a larger container or placed on a single pallet. However the invention permits the thermal properties of those containers types to be different by inserting an insert or inserts during the moulding process to provide additional space in the walls of the container to accommodate additional insulation panels, which may be vacuum insulation panels. These will typically have greater insulation properties than the volume of expanded foam of the walls that would otherwise be present. Thus, if a container is expected to undertake either a shorter journey or a journey at lower ambient temperatures, the first container type may be selected, but if the product is to undertake a longer journey, or a journey in elevated ambient temperatures, then the second container type may be selected having improved thermal insulation properties.

The method may additionally comprise placing an insulation panel in the space in the base of the main body formed by the insert or inserts to provide thermal insulation panels to five sides of the products.

The method may further comprise, for a first container type providing a mould tool having dimensions for moulding a lid of a first container type; and using the mould tool to mould a lid of a first container from expanded foam; and for a second container type: placing an insert or inserts within the mould tool for a lid of the first container type; and using the mould tool to mould a lid of a second container type from expanded foam. In this manner, a lid may also be provided specific to a first or second container type, so that insulation panels may be accommodated in recesses in the lid formed by the insert or inserts.

The advantages of this aspect of the invention is that it may permit the main bodies and lids of two container types to be moulded using common mould tools or components, with it only being necessary to add an insert or inserts to the mould tool to permit additional insulation panels, where these are required, to be accommodated within the container formed by the method.

A method in accordance with the second aspect of the invention may be advantageously used to form a container in accordance with a first aspect of the invention.

BRIEF DESCRIPTION OF THE DRAWINGS

One embodiment of the present invention will now be described by way of example only, with reference to the accompanying figures, of which.

DETAILED DESCRIPTION OF THE INVENTION

Figure 1:
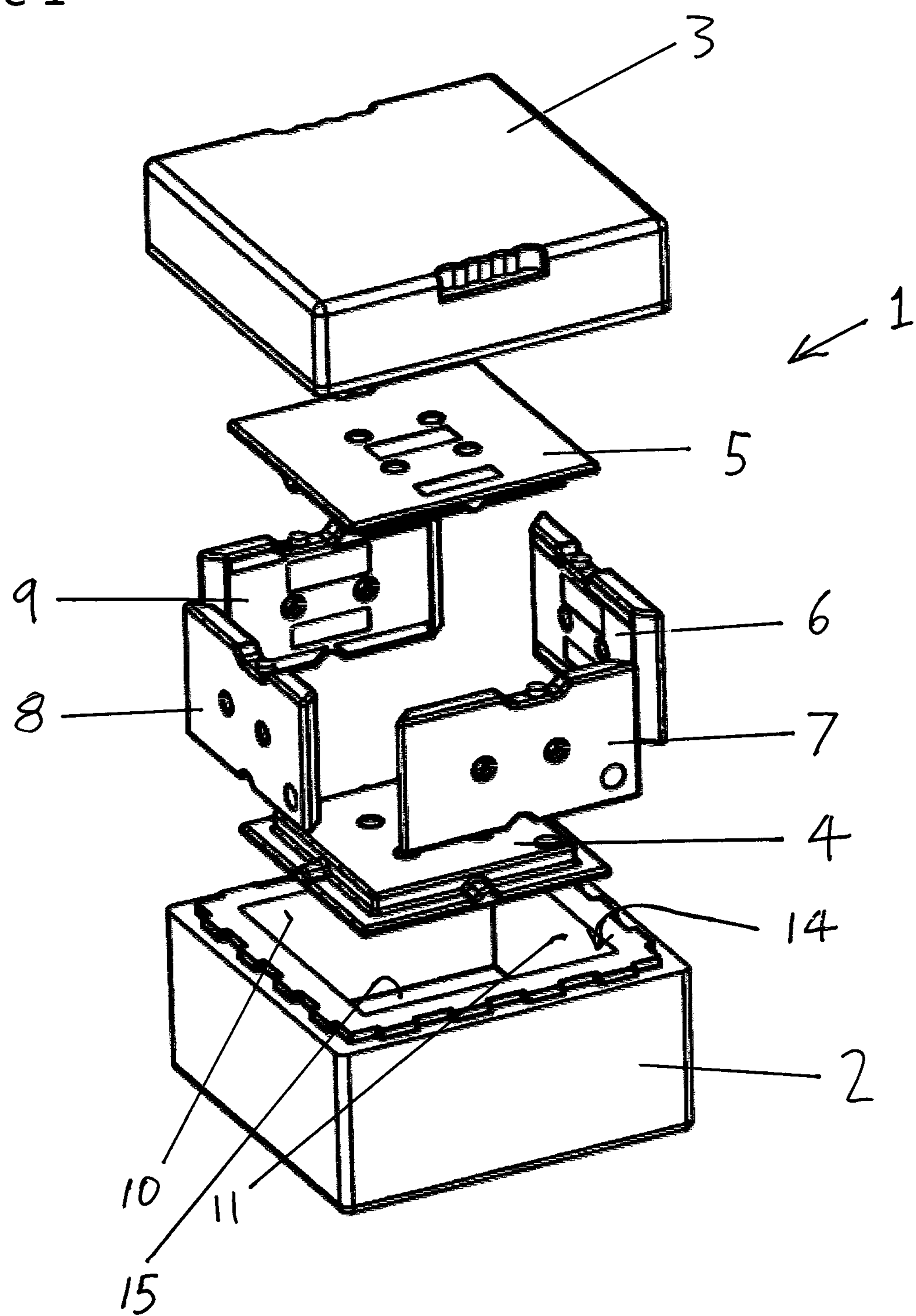
FIG. 1 is an exploded view of a first container type in accordance with the present invention.
Figure 2:
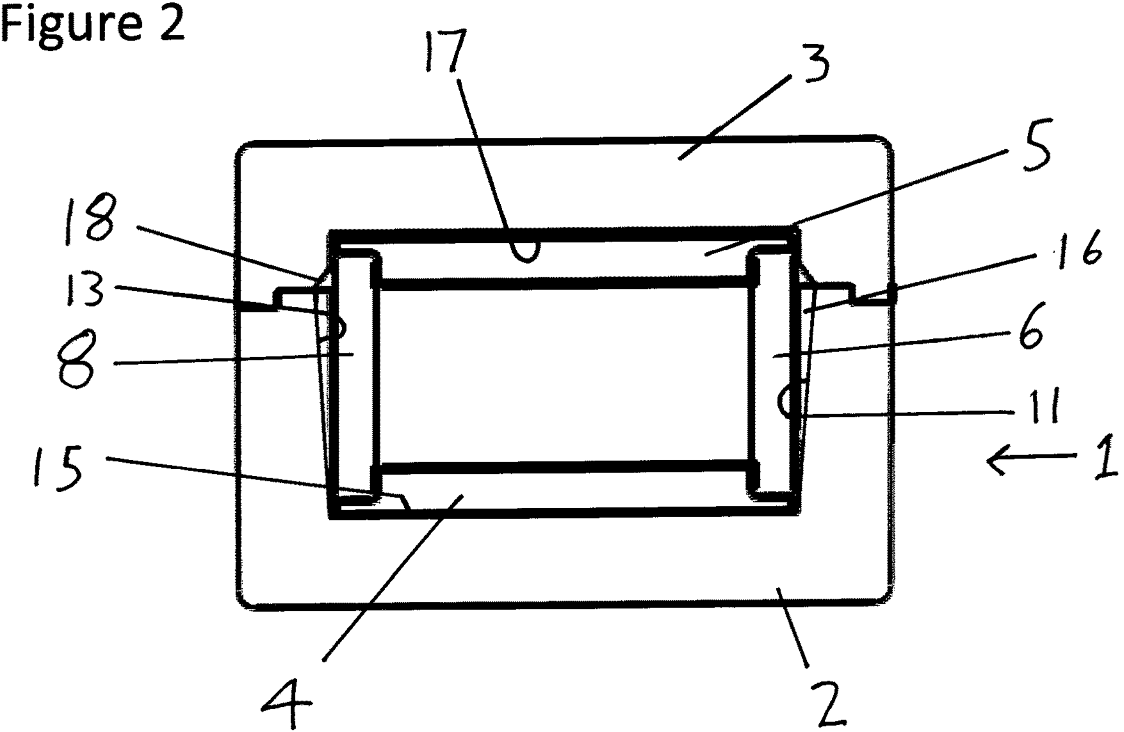
FIG. 2 is a cutaway side elevation of the container of FIG. 1.
Figure 3:
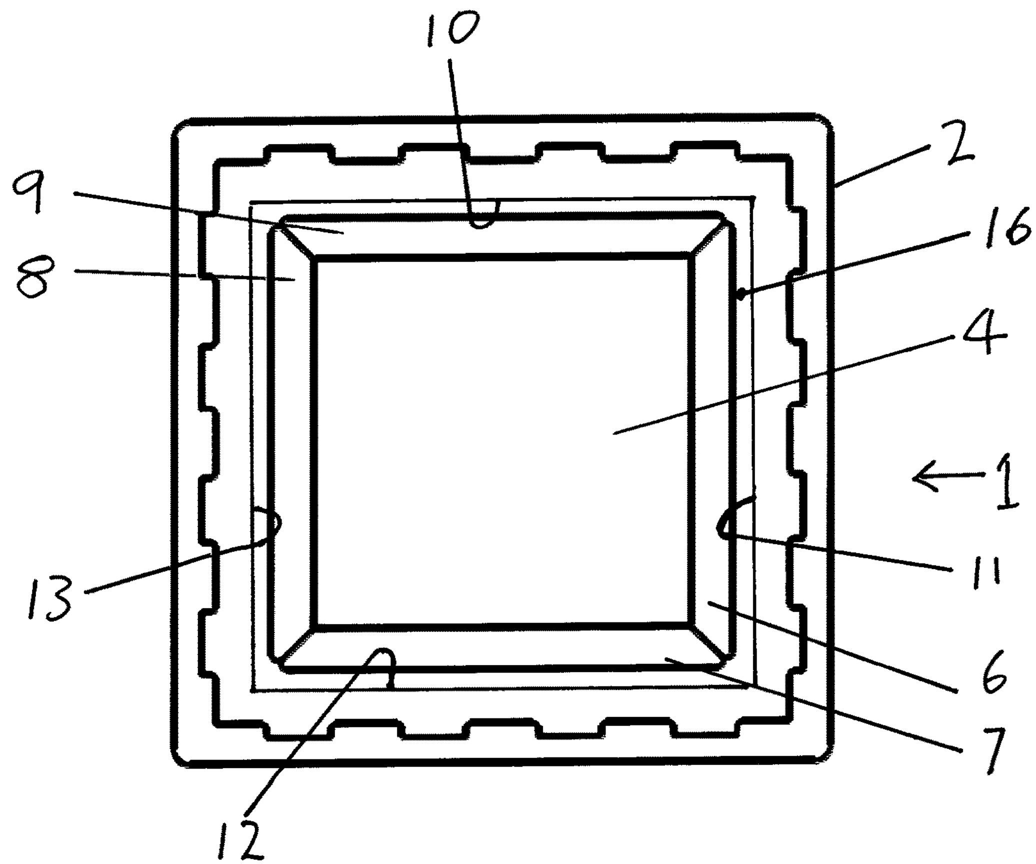
FIG. 3 is a plan view of the container of FIGS. 1 and 2 with the lid removed.

Referring to FIGS. 1 to 3, a container indicated generally as 1, comprises a main body 2, a lid 3, a base cool pack 4, an identical (but inverted) top cool pack 5 and four identical wall cool packs 6 to 9.

The main body 2 and lid 3 are each formed by being moulded from expanded foam polystyrene. With reference to the main body 2, the inner walls surfaces 10 to 13, extending from the mouth 14 of the main body to the inner base surface 15 of the main body, are tapered, as can be most clearly seen from FIG. 2. This is necessary in order for the main body 2 to be released from the mould tool that formed it. As seen from FIG. 3, this tapering defines a space 16 around the upper portions of the cool packs 6 to 9. Thus, although the cool packs 6 to 9 are prevented from moving inwardly by their chamfered side edges abutting, as shown in FIG. 3, without the lid 3 being present they may move outwardly which will then permit a product packed within the space defined inside the cool packs 6 to 9 to move during transportation, which may result in damage to the product. This may also reduce the thermal efficiency of the container, for if correctly positioned the cool packs 4 to 9 themselves may form a barrier to convection currents in the container 1.

As can be seen from FIG. 1, base cool pack 4 and top cool pack 5 both have a step formed around their edges, which steps respectively accommodate bottom and top edges of the wall cool packs 6 to 9, providing a stepped flow path for any convection between the cool packs, restricting convection between the bottom and top edges of the wall cool packs 6 to 9 and the respective base and top cool packs 4, 5. The step also ensures that, even when slightly misaligned, the side wall cool packs will remain in close proximity to respective surfaces of the steps around the edges of the base and top cool packs 4 and 5, with the chamfered edges of the side wall cool packs 6 to 9 also acting to reduce convection between adjacent wall cool packs 6 to 9 when they are correctly abutted together.

As can be seen from FIG. 2, the lid 3 has an inner roof surface 17 which has the same dimensions as the inner base surface 15. The lid 3 has inner walls surfaces which are also tapered to permit the lid to be released from the inner mould tool. However as the walls of the lid are relatively short they have an increased taper in the form of chamfer 18, so that when the lid 3 is positioned in place, the tapered inner surfaces of the walls of the lid, including chamfer 18, force the wall cool packs 6 to 9 into a vertical orientation as shown in FIGS. 2 and 3, acting to correctly lock the cool packs together, minimising any convection currents between the side edges of adjacent cool packs or top and bottom edges of the wall cool packs 6 to 9 and the respective base and top cool packs 4 and 5.

Figure 4:
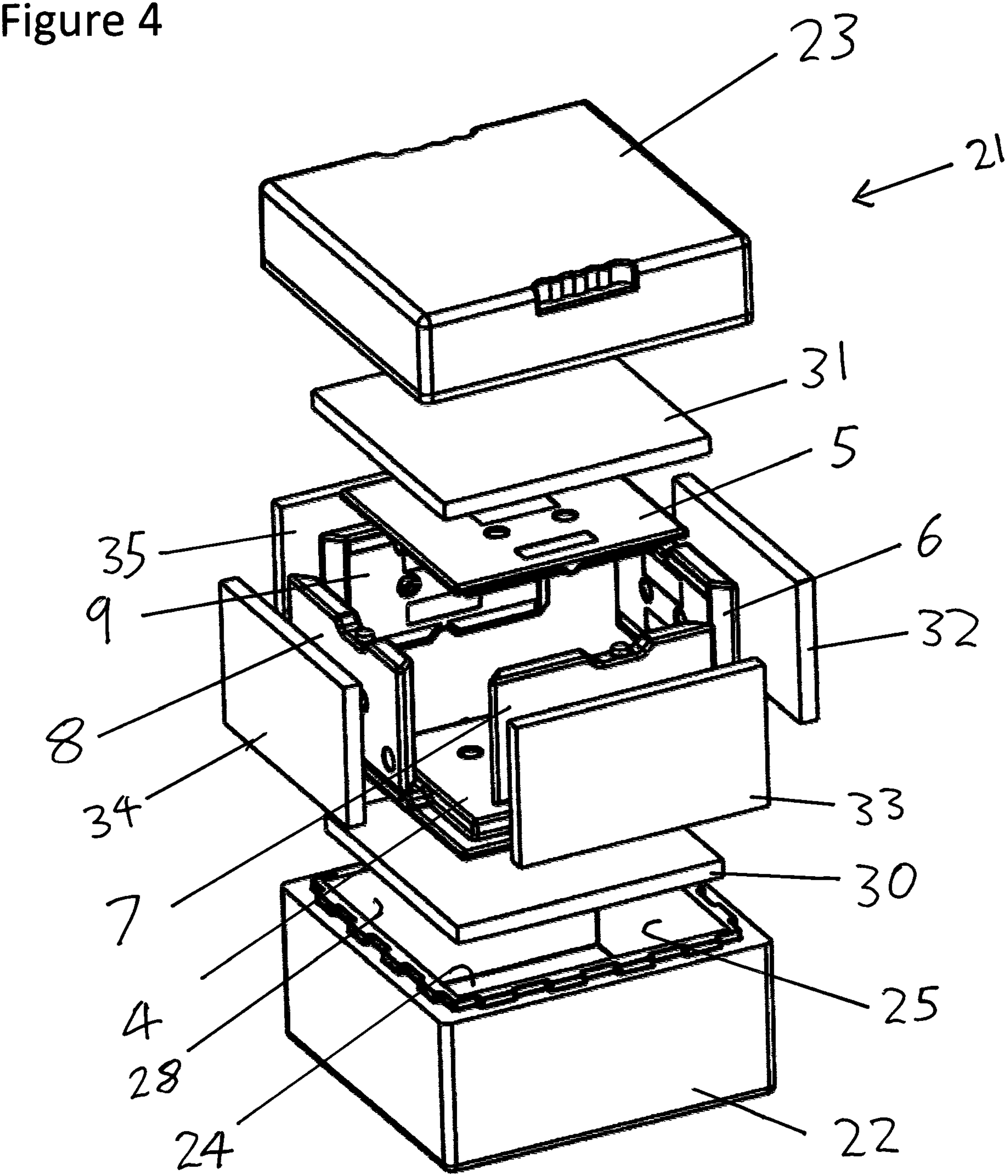
FIG. 4 is an exploded view of a second container type in accordance with the present invention.
Figure 5:
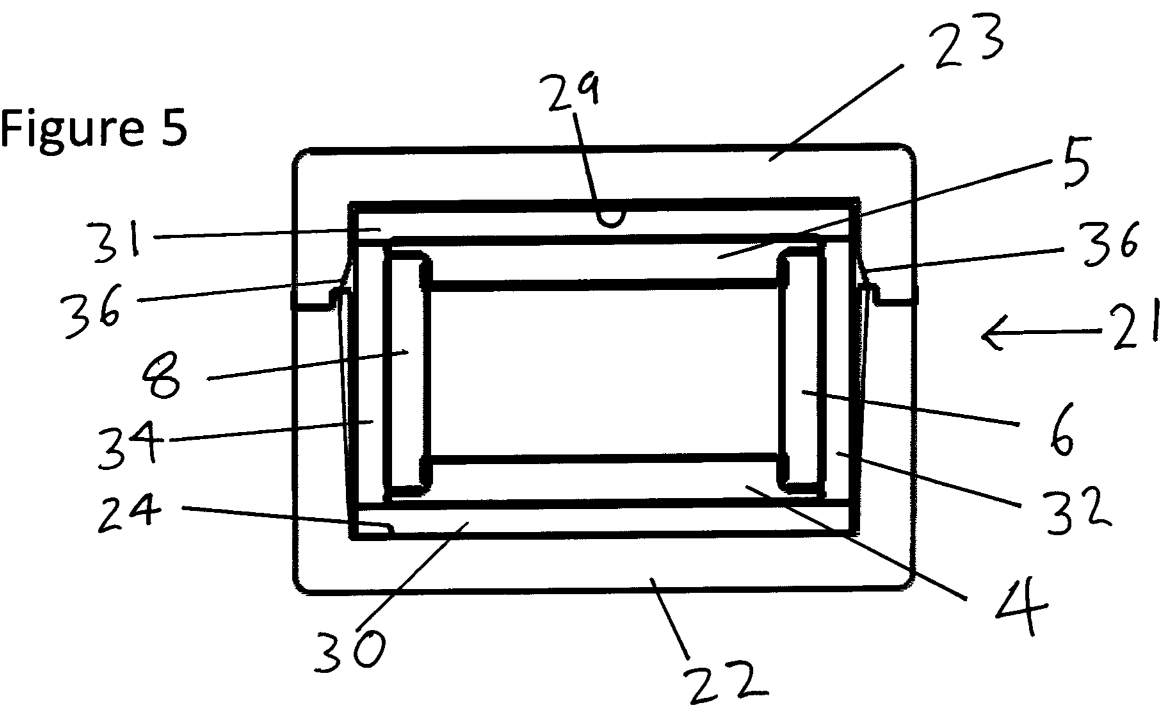
FIG. 5 is a cutaway side elevation of the container of FIG. 4.
Figure 6:
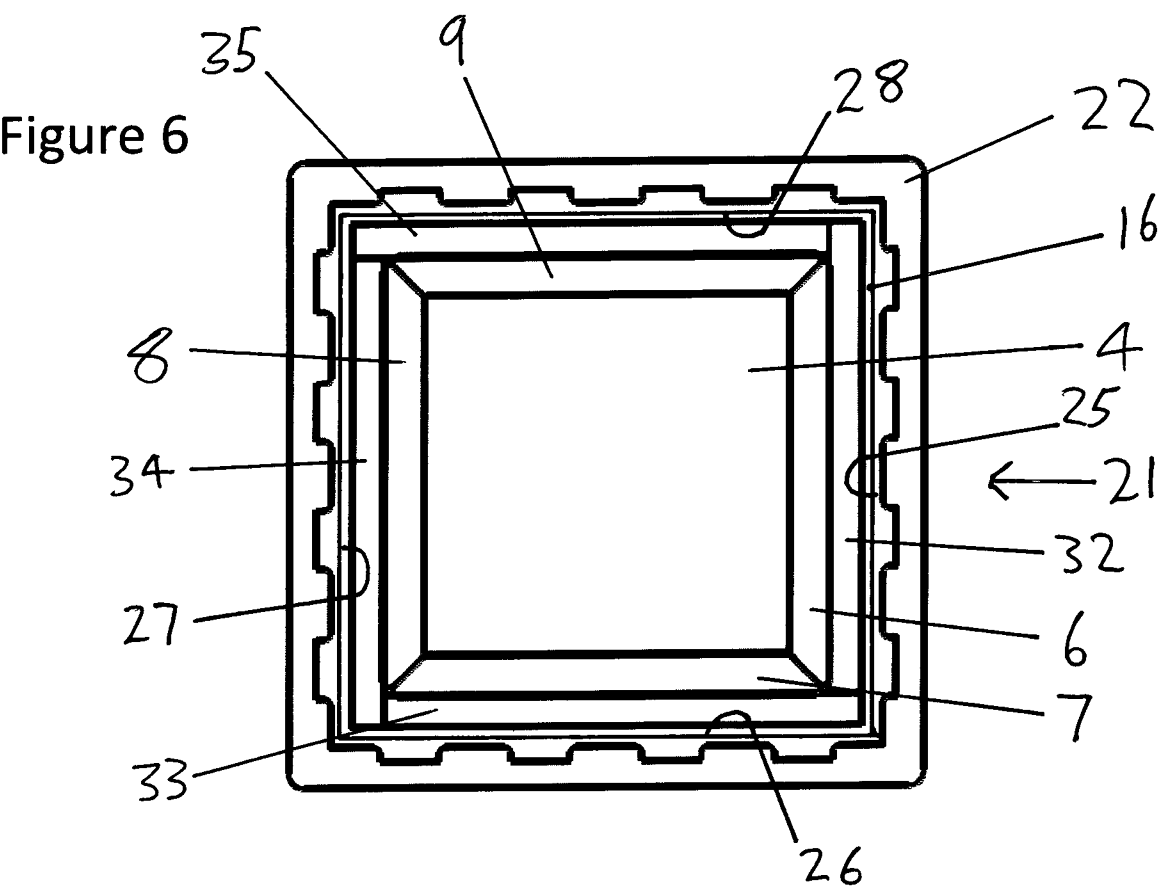
FIG. 6 is a plan view of the container of FIGS. 4 and 5 with the lid removed.

With reference to FIGS. 4 to 6, these are corresponding views to those of FIGS. 1 to 3, but show a second type of thermally insulated shipping container, indicated generally as 21. This second type of container 21 comprises the same identical base and top cool packs 4 and 5 and identical side wall cool packs 6 to 9 as the first container type illustrated in FIGS. 1 to 3. Thus these cool packs 4 to 9 are interchangeable between the two container types 1 and 21. However, the expanded foam main body 22 and lid 23 of the second container type 21 are different from those of the container 1 of FIGS. 1 to 3. Although the expanded foam main body 22 and lid 23 are produced in the same mould tool as their counterparts 2 and 3, inserts have been added to the mould tool forming the inner surfaces of the main body 22 and lid 23, so that the inner base surface 24 is slightly deeper and respective pairs of opposed inner wall surfaces 25 to 28 are further apart, with the inner surfaces of the lid correspondingly spaced further apart and the inner roof surface 29 of the lid 23 being slightly higher. Into the additional spaces created there is inserted, as shown in FIGS. 4 to 6, a base vacuum insulation panel 30, an identical top vacuum insulation panel 31 and four identical wall vacuum insulation panels 32 to 35. Here chamfer 36 on the bottom edge of the inner surfaces of the walls of the lid 23 urges the wall vacuum insulation panels 32 to 35 together as shown in FIGS. 5 and 6, in the same manner as the lid 3, of FIGS. 1 to 3, directly urges the wall cool packs 6 to 9 together.

With the second container type 21, illustrated in FIGS. 4 to 6, the lid 23 via the side wall vacuum insulation panels 32 to 35, acts on the wall cool packs 6 to 9 to maintain them in a vertical orientation where they abut closely together, both with each other and with the base cool pack 4 and top cool pack 5, in the same manner as previously discussed with reference to FIGS. 1 to 3.

Thus, it is seen that by adding an insert or inserts to the mould tool that form the main body 2 and the lid 3, the internal dimensions of the main body and lid can be varied so that if desired the container 21 can be formed to additionally accommodate a layer of vacuum insulation panels, or other types of insulation panels, around the outside of the cool packs, to provide improved thermal efficiency where this is required.

Two embodiments of the present invention have been described by way of example only, but it will be appreciated that further modifications will be apparent to those skilled in the art which will fall within the scope of the appended claims.

The invention claimed is:

1. A thermally insulated container comprising:

a a main body comprising a base and four body walls extending upwardly from the base, the base having an inner surface, each of the four body walls having a top, a bottom and an inner surface that tapers inwardly from the top to the bottom;

a removeable lid comprising a roof and four lid walls extending downwardly from the roof and configured to engage the main body, each lid wall having an inner surface;

a base cool pack, a top cool pack and four side wall cool packs, the base cool pack having four upwardly facing edges, each upwardly facing edge defining an upwardly facing step, the top cool pack having four downwardly facing edges, each downwardly facing edge defining a downwardly facing step, each side wall cool pack having an upper portion, top edge, a bottom edge and four side edges, each side wall cool pack extending from one of the upwardly facing steps to one of the downwardly facing steps; wherein:

when the lid is affixed to the main body, the side wall cool packs are held in a stationary position; and wherein when the lid is removed from the main body, the upper portion of each side wall cool pack can move outwardly.

2. The container as claimed in claim 1, wherein:

when the lid is affixed to the main body the inner surface of each lid wall contacts the upper portion of each side wall cool pack so that the side wall cool pack is perpendicular to the inner surface of the base.

3. The container as claimed in claim 2, wherein:

at least a portion of the inner surface of each lid wall tapers outwardly.

4. The container as claimed in claim 3, wherein the lid and main body are moulded from expanded foam.

5. The container as claimed in claim 4, wherein the expanded foam is expanded polystyrene.

6. The container as claimed in claim 1, wherein the side edges of each side wall cool pack are arranged to abut those of two adjacent side wall cool packs when the lid is affixed to the main body.

7. The container as claimed in claim 1, wherein:

the tapered inner surface of each main body wall and a respective one of the side wall cool packs define a space therebetween.

8. The container as claimed in claim 1, wherein the base cool pack and top cool pack are substantially identical.

9. The container as claimed in claim 8, wherein the four side wall cool packs are substantially identical.

10. The container as claimed in claim 1, wherein the cool packs are flexible.

11. The container as claimed in claim 1, wherein the cool packs are rigid.

12. The container as claimed in claim 11, wherein the cool packs are formed from high density polyethylene.

13. The container as claimed in claim 1, wherein the inner surfaces of the walls of the main body and the inner surface of the walls of the lid directly contact the side wall cool packs.

14. The container as claimed in claim 1, further comprising a layer of insulation panels located between the inner walls of the main body and the cool packs.

15. The container as claimed in claim 14, wherein the insulation panels are vacuum insulation panels.

* * * * *